K. KIEFER.
MOUNTING FOR CONVEYER ROLLERS.
APPLICATION FILED DEC. 30, 1914.

1,175,641.

Patented Mar. 14, 1916.
2 SHEETS—SHEET 1.

Witnesses
E. E. Finch
M. A. Harrington

Inventor
Karl Kiefer

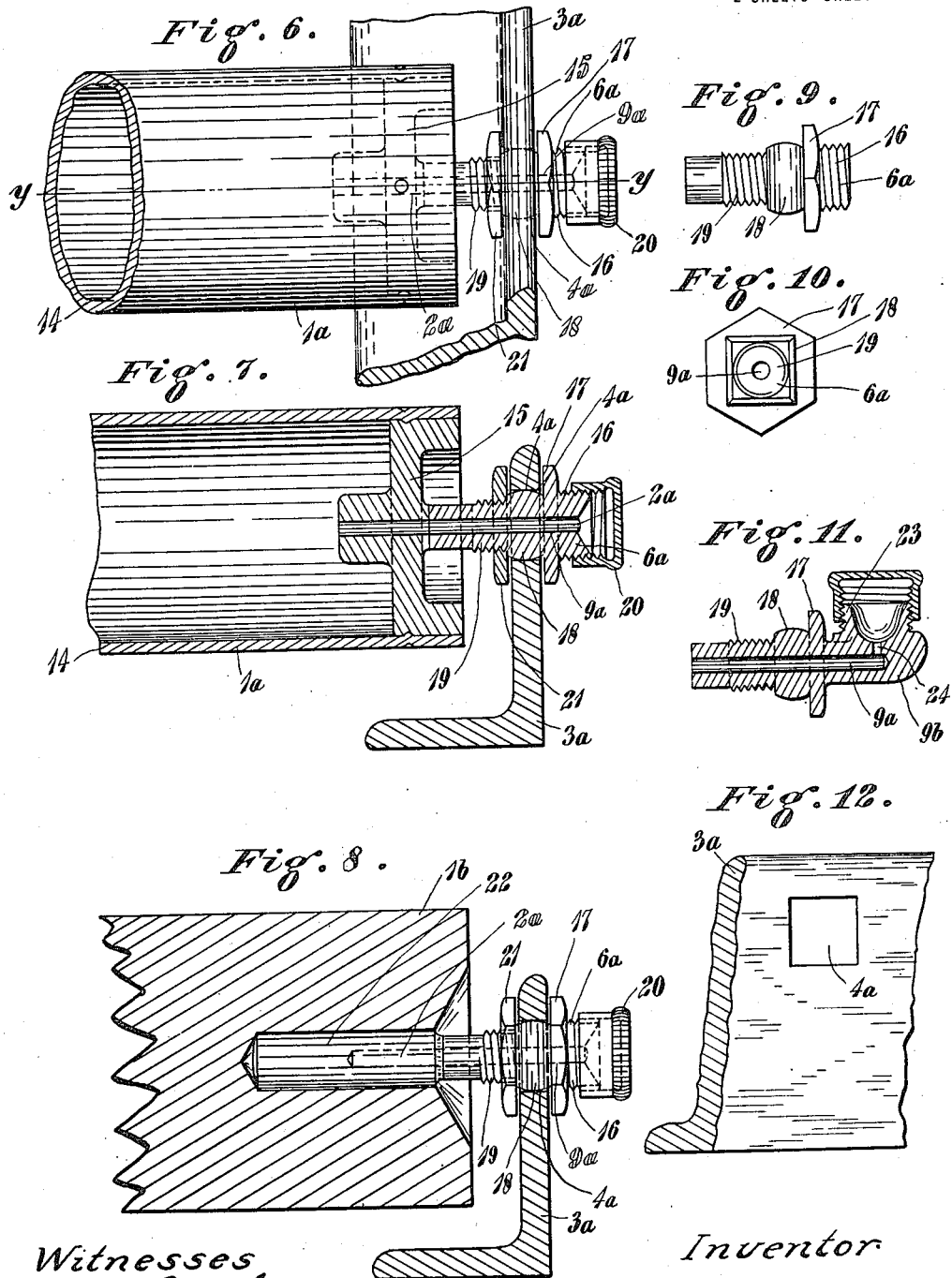

UNITED STATES PATENT OFFICE.

KARL KIEFER, OF CINCINNATI, OHIO.

MOUNTING FOR CONVEYER-ROLLERS.

1,175,641. Specification of Letters Patent. Patented Mar. 14, 1916.

Original application filed November 6, 1911, Serial No. 658,866. Divided and this application filed December 30, 1914. Serial No. 879,697.

*To all whom it may concern:*

Be it known that I, KARL KIEFER, a citizen of the United States, and a resident of Cincinnati, in the county of Hamilton and State of Ohio, have invented certain new and useful Improvements in Mountings for Conveyer-Rollers, of which the following is a specification.

My invention relates to roller conveyers operating under the action of gravity; and its object is to provide mountings or bearings for the rollers of such conveyers, of simple and economical construction, which will at the same time operate with a minimum of friction and require a minimum of lubrication and attention.

My invention consists in the parts and in the details of construction and arrangement of parts as will hereinafter be more fully described and claimed.

Figure 1:
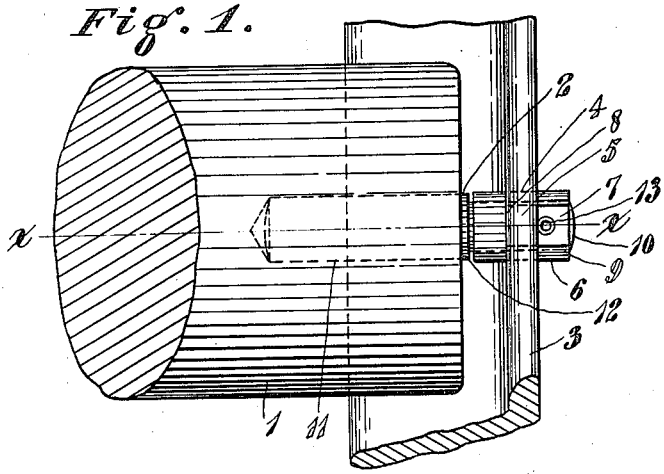
Figure 3:
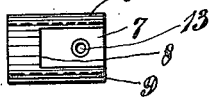
Figure 4:
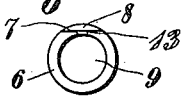
Figure 2:
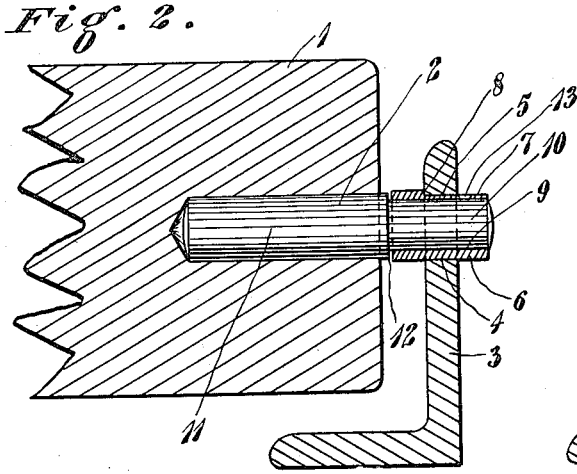
Figure 5:
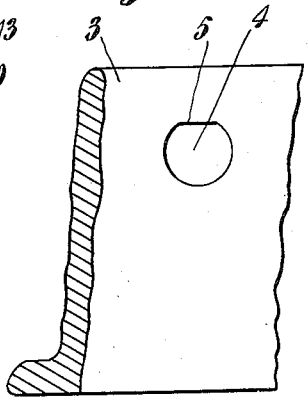

In the drawings: Figure 1 is a plan view of part of a roller and part of the conveyer frame, showing my improved bearing provided in connection therewith, the roller being represented as made of wood; Fig. 2 is a vertical longitudinal section on the line $x$—$x$ of Fig. 1; Fig. 3 is a detail plan view of one of the bearing blocks; Fig. 4 is an end view of the same; Fig. 5 is a view of part of the side frame of the conveyer, showing the socket for the bearing block; Fig. 6 is a plan view similar to Fig. 1, but showing a modification of my invention, and the roller being represented as made of metal tubing; Fig. 7 is a vertical longitudinal section on the line $y$—$y$ of Fig. 6; Fig. 8 is a sectional view similar to Fig. 7, showing how a wooden roller is provided with the modified mounting or bearing; Fig. 9 is a detail plan view of the modified bearing block shown in Figs. 6 and 7; Fig. 10 is an end view of the same; Fig. 11 is a vertical longitudinal sectional detail of a modification of the same; and Fig. 12 is a view of part of the side frame similar to Fig. 5, showing the socket for the modified bearing block.

The invention set forth herein was originally shown, described and claimed in my co-pending application Serial No. 658,866, filed November 6, 1911, of which this application is a division.

As shown in Figs. 1 to 5, inclusive, the roller 1 has the spindle 2 fixed centrally in its end part. The side rail 3, here shown as composed of a steel angle, has sockets 4 in its vertical leg near the upper edge thereof. These sockets are simply holes which are circular except at one side, preferably the top, where a segmental area of the material of the rail is left, making a flat side 5 to the socket. A bearing hub 6 fits into each socket and receives a spindle 2 of a roller, which spindles were above described. The bearing hub is cylindrical except at one side, from its end inwardly for the greater part of its length, which has a segmental part removed, leaving this side 7 flat, and, where this flattened part terminates, forming a shoulder 8. The bearing hub 6 is thus slipped through the socket 4 in the rail from the inside of the rail until the shoulder 8 comes against the inner side of the rail, and the flat side 7 of the hub 6 will thus coöperate with the flat side 5 of the socket 4 to prevent rotation of the hub in the socket. This hub has a cylindrical bore 9 that receives a reduced part 10 of the spindle 2, which reduced part joins the main part 11 of the spindle 2 which fits in the roller 1 by a shoulder 12. This shoulder 12 will bear against the inner end of the bearing hub 6 and limit the end play of the roller. Preferably the parts are so adjusted that the shoulder 12 may move a slight distance away from the adjacent end of the bearing hub 6 as shown, so that the roller has a slight end play. The bearing hub 6 may have an opening 13 through its flat side 7 into the bore 9 to admit lubricant to the bearing.

In the modification shown in Figs. 6 and 7, the roller 1ª comprises a tube 14, in the end of which a hub 15 is fixed. This hub has the spindle 2ª fixed in it centrally. The side rail 3ª, here shown as composed of a steel angle, has sockets 4ª in its vertical leg, near the upper edge thereof. These sockets are simply square holes, with equal vertical and horizontal sides, parallel from one side of the rail through to the other. A bearing hub 6ª fits into each socket and receives a spindle 2ª of a roller, which spindles were above described. The bearing hub 6ª consists, in order from one end to the other, in a threaded part 16; a flange 17; a part 18, square, with its sides straight and equal cross-sectionally of the hub, but with sides convex longitudinally of the hub; and, finally, a threaded part 19. The first described part 16 is recessed, on the end of the hub, and the bore 9ª, which receives the spindle 2ª, extends from end to end of the hub, opening into this recessed part. The first described threaded part 16 receives the cap 20, which, by being screwed onto the hub, compresses grease into the recess and into the bore 9ª, to lubricate the bearing. The flange 17 is to act as a curb against the side of the frame when the square part 18 is in the socket 4ª of the frame. A nut 21 is screwed onto the second described threaded part, to act as a curb on the other side of the frame. The square part 18 is somewhat greater in extent, lengthwise of the hub, than the thickness of the rail of the frame, so that the curbs 17 and 21 cannot bind the hub in the frame, but will allow some lateral motion therein. The convexity of the square part 18 is such that opposite sides conform to concentric arcs struck from the center of the hub. Thus, the lateral motion may manifest itself in a slight swiveling of the hub in the frame. The swiveling movement thus allowed, renders the hubs self-adjusting to the spindles, permitting the necessary even distribution of pressure throughout the long and narrow bearing, under any variations, either due to inaccuracy of construction, or to slight deflection of the spindles, even under the light load on each individual roller. The bearing hubs 6ª meet the hubs 15 of the rollers, limiting the end play.

Where it is desired to use a wooden roller, as the roller 1ᵇ, shown in Fig. 8, it may have a hub 22, of metal, inserted into its end, which receives the spindle 2ª as above described in connection with the tubular roller.

The modified bearing hub 6ᵇ illustrated in Fig. 11 has the vertical threaded part 23, corresponding to the part 16 of the above described hub, and this part is recessed and has a short vertical passage 24, down to the bore 9ª of the hub. Thus, gravity may assist in forcing the lubricant into the journal.

A bearing of the above described principle of construction is peculiarly adapted to conveyer rollers, avoiding the friction of the commonly designed bearings on account of the extremely low surface speed of the thin spindle, which, however, has the full required area, due to its length. The length of these spindles should be considerably greater than the diameter of the spindles, and the thickness of the spindles of course should be adapted to the particular requirements of the conveyer. Light loads which require a more sensitive conveyer apparatus permit of using very thin spindles; for heavier loads, larger size spindles are to be used.

In either example as shown in Figs. 1 to 5, inclusive, or in Figs. 6 to 12, inclusive, considerable swiveling movement is allowed as alluded to above. In the first example, this is rendered possible by fitting the bearing hub 6 somewhat loosely in the socket 4. This will allow it to have sufficient swiveling motion similar to that allowed by the hub in the latter example, and yet the flat sides 5 and 7 and the shoulder 8 against the side rail will hold the bearing hub in its proper position.

Having fully described my invention, what I claim as new and desire to secure by Letters Patent is:

1. In a conveyer, a roller, a spindle therefor, a side frame made of comparatively thin and flat metal having an opening therein, and a journal bearing for the spindle supported in said opening, the journal bearing being allowed to swivel in the opening but prevented from rotating therein.

2. In a conveyer, a roller, a spindle therefor, a side frame with an angular socket through it having sides substantially straight and parallel from end to end through said frame, and an angular bearing hub fitting in said socket with sides and angles substantially conforming to the sides and angles of said socket from angle to angle, but convex from end to end through the socket, said bearing hub receiving said spindle and forming a bearing for said spindle prevented from turning around the spindle, but swiveling through an angle with the axis of the spindle.

3. In a conveyer, a roller, a spindle therefor, a side frame with an angular socket through it having sides substantially straight and parallel from end to end through said frame, and an angular bearing hub fitting in said socket with sides and angles substantially conforming to the sides and angles of said socket from angle to angle, but convex from end to end through the socket, said bearing hub receiving said spindle and forming a bearing for said spindle prevented from turning around the spindle, but swiveling through an angle with the axis of the spindle, and a curb on said hub slightly spaced away from one side of said frame to prevent displacement of the hub from the socket but to allow said swiveling of the hub therein.

4. In a conveyer, a roller, a spindle therefor, a side frame with an angular socket through it having sides substantially straight and parallel from end to end through said frame, and an angular bearing hub fitting in said socket with sides and angles substantially conforming to the sides and angles of said socket from angle to angle, but convex from end to end through the socket, said bearing hub receiving said spindle and forming a bearing for said spindle prevented from turning around the spindle, but swiveling through an angle with the axis of the spindle, the diameter of said spindle being minimized and its length of bearing in said hub being increased to afford the required bearing area, the swiveling of said bearing in said side frame distributing the pressure throughout the bearing area of said spindle, for the purposes described.

5. In a conveyer, a roller, a spindle therefor, a side frame with a rectangular socket extending through it with its sides substantially straight and parallel through the frame, a bearing hub of rectangular cross section fitting in the socket with its sides substantially conforming to the sides of the socket from angle to angle around the bearing hub, but with the sides convex from end to end through the socket, said bearing hub receiving said spindle, and forming a bearing therefor prevented from turning around the spindle, but swiveling through an angle with the axis of the spindle.

6. In a conveyer, a roller, a spindle for said roller, and a journal for said spindle, the diameter of said spindle and its journal being minimized to allow a low surface speed, and the length of said journal being increased to afford the required bearing area, and a swivel bearing hub carrying said journal and distributing the pressure in said journal, for the purposes described.

7. In a conveyer, a roller, a spindle therefor, side frames of relatively thin cross section having holes spaced therein for the reception of the bearing, a bearing loosely fitting in these holes, consisting of a tube with a flat part thereon.

In testimony whereof I have hereunto signed my name in the presence of two subscribing witnesses.

KARL KIEFER.

Witnesses:
  E. E. FINCH,
  M. A. HARRINGTON.